United States Patent

[11] 3,631,335

[72] Inventors Allan E. Carr
Thousand Oaks;
Michael I. Behr, South Pasadena, both of Calif.
[21] Appl. No. 14,071
[22] Filed Feb. 25, 1970
[45] Patented Dec. 28, 1971
[73] Assignee Burroughs Corporation
Detroit, Mich.

[54] METHOD AND APPARATUS FOR MEASURING MAGNETIC GAP LENGTH
10 Claims, 6 Drawing Figs.

[52] U.S. Cl. .................................................. 324/34 R,
179/100.2 T, 179/100.2 B, 340/174.1 F
[51] Int. Cl. .............................................. G01r 35/00
[50] Field of Search .......................................... 324/34, 34
TA; 179/100.2 T, 100.2 B; 340/174.1 F

[56] References Cited
OTHER REFERENCES

Wang, H. S. C.; Gap Loss Function & Determination of Certain Critical Parameters in Magnetic Data Recording Instruments & Storage Systems, Rev. of Sci. Inst.; Vol. 37, No. 9, Sept. 1966, pp. 1124– 1130.

Wang, H. S. C.; Estimation of Small Effective Gap Length Beyond Recording Resolution In Magnetic Data Recording Systems; Jour. of Sci. Inst.; Vol. 1, Series 2, Apr. 1968, pp. 487– 489.

*Primary Examiner*—Rudolph V. Rolinec
*Assistant Examiner*—R. J. Corcoran
*Attorney*—Christie, Parker & Hale ABSTRACT: A technique is provided for measuring the magnetic gap length of a magnetic transducer, particularly useful when the gap length is only a few microns as is the case in modern transducers for high-density recording. According to this technique, a magnetic signal of known frequency is written on a magnetic recording medium with a recorded wavelength being in the same order of magnitude as the magnetic gap length of the recording transducer. The same transducer is then employed for reading the recorded magnetic signals and the signal amplitude is measured over a very short frequency band so that the effect of most noise accompanying the signal is eliminated. These operations are repeated over a series of recorded wavelengths spanning the wavelength where the ratio of magnetic gap length to wavelength is about 0.88 at which point a signal minimum or null is observed. Knowing the frequency of the signal minimum permits a determination of the gap length.

INVENTORS.
MICHAEL I. BEHR
ALLAN E. CARR
BY
Christie, Parker & Hale
ATTORNEYS

METHOD AND APPARATUS FOR MEASURING MAGNETIC GAP LENGTH

BACKGROUND

In recent years there has been a significant increase in the density at which digital data is recorded on magnetic materials. Data densities in the order of a few thousand bits per inch are becoming commonplace and in order to record and read data at such high bit densities, the gap length of the magnetic transducer must be short compared with the wavelength of the signal recorded. This means that the magnetic gap length of the transducer is in the order of only a few microns.

A significant parameter effecting the reading and writing characteristics of a magnetic recording transducer is the magnetic length of the gap between the transducer pole pieces and the magnetic gap is not necessarily the same as the gap observed by optical techniques. It is, therefore, desirable to provide a technique for measuring the actual magnetic length of the gap rather than merely the mechanical distance between the pole pieces.

In writing and reading information on a magnetic recording medium, there are a number of losses of signal strength which may accumulate to degrade overall system performance. The signal loss due to the necessarily finite gap length is known to vary according to the formula $$L_g = 20 \log_{10} \left[ \left\{ \frac{\sin (\pi g/\lambda)}{(\pi g/\lambda)} \right\} \left\{ P_n\left(\frac{\lambda}{g}\right) \right\} \right]$$

Where $L_g$ is the signal loss due to the magnetic gap length, $g$ is the gap length, $\lambda$ is the recorded wavelength and $P_n$ is a polynomial, the exact form of which is not of importance for purposes of this invention. From this formula the signal loss due to a finite gap length exhibits a series of lobes with nulls or signal minimums occurring at regular increments of the gap length as sown in FIG. 1. In the graph of FIG. 1 the abscissa is the ratio of the magnetic gap length to the recorded wavelength $g/\lambda$ and the ordinate is the signal loss in decibels. For a discussion of this relation, see *The Physics of Magnetic Recording*, Vol. II, Selected Topics in Solid State Physics, John Wiley & Sons, 1964.

The general reason for the nulls can be visualized for a condition when the recorded wavelength is exactly the same as the magnetic gap length. In this condition, one pole piece of the magnetic transducer may be adjacent a region in the magnetic recording medium having a maximum magnetic intensity in one direction, for example, and the other pole piece will be adjacent another region of the magnetic recording medium also having a maximum magnetic intensity in the same polarity. Since both pole pieces are encountering the same magnetic field, there is no flux induced in the magnetic core and no signal should be obtained upon reading. This intuitive picture is not exactly accurate since it has been amply demonstrated, both experimentally and according to wave theory, that this absence of signal occurs not at a recorded wavelength exactly equal to the gap length, but instead occurs at a wavelength where the ratio of recorded magnetic gap length $g$ to wavelength $\lambda$ is 0.88. It is also shown experimentally and theoretically that nulls in signal strength also occur at integral multiples of the ratio so that, as seen in FIG. 1, a series of nulls are produced in the loss curve at $g/\lambda$ values of 0.88, 1.76, 2.64, etc. When it is indicated that the gap is found to be about 0.88 $\lambda$ it should be recognized that this is the predicted value and that, experimentally, variations of about 10 percent from this value are observed, due largely to surface properties and imperfections in magnetic pole pieces.

Thus, on a theoretical basis, it would appear possible to measure the magnetic gap length merely by scanning a range of wavelengths and noting the nulls in signal strength. There is, however, an additional signal loss during reading of magnetic signals due to the separation or spacing "$a$" between the magnetic transducer and the magnetic recording medium. This loss is given by the formula $L_a = 20 \log_{10} \epsilon(2\pi a/\lambda)$ where $L_a$ is the separation or spacing loss. It will be seen from this equation that the spacing loss rapidly increases with decreasing recorded wavelength $\lambda$ and with increasing distance "$a$" between the transducer and the recording medium. The output signal from a magnetic transducer is decreased by the product of the losses so that, at short wavelengths, appreciable spacings, and adjacent gap loss nulls, the total signal strength may be very low.

A common type of magnetic recording system in use as peripheral equipment for computers employs a disk rotating at relatively high speed with a plurality of magnetic transducers arranged adjacent to the faces of the disk. A magnetic recording medium on the faces of the disk record data as written by and for reading by the transducers. Since the rigid disk is continuously moving at high speed, it is not feasible to have the recording transducers in contact with the disk and they are normally supported on an air bearing between the recording head, containing the transducers and the surface of the disk. This results in a separation "$a$" between the magnetic transducer and the recording medium in the order of about 100 microinches.

Such disk recording systems are employed with very high data densities and therefore very short magnetic gaps are included in the transducers. For this reason in order to measure the length of magnetic gap, the recorded wavelength, which must be of the same order as the gap length, is very short. Therefore, in a typical disk recording system, the separation or spacing loss is of a sufficient magnitude that, near the wavelengths where the gap loss minima occur, the signal strength is so low that the minima or nulls are completely obscured by random noise. One cannot, therefore, merely scan a band of wavelengths in order to find the nulls.

In other magnetic recording systems, such as tapes where the transducer is in contact with the recording medium, other signal losses, such as those due to the thickness of the recording medium or demagnetization, also tend to obscure the nulls at the short wavelengths necessary to measure typical transducer magnetic gaps of only a few microns in length.

It is, therefore, desirable to provide a technique for locating the magnetic gap nulls in the presence of noise.

BRIEF SUMMARY OF THE INVENTION

Therefore, in practice of this invention according to a preferred embodiment, there is provided method and apparatus for measuring magnetic gap length of a magnetic transducer wherein the transducer is employed for writing on a magnetic recording medium a magnetic signal having a known recorded wavelength in the same order of magnitude as the gap length of the transducer. The transducer is employed for reading the recorded signals from the recording medium and the amplitude of the read signal is measured in a narrow frequency band spanning the recorded frequency to substantially eliminate the effect of noise and this procedure is repeated over a range of recorded wavelengths spanning the magnetic gap length of the transducer, or a small multiple thereof, for identifying the position of nulls in signal strength.

DESCRIPTION OF THE DRAWINGS

These and other features and advantages of the present invention will be appreciated as the same becomes better understood by reference to the following detailed description of a presently preferred embodiment when considered in connection with the accompanying drawings wherein.

DESCRIPTION

Figure 1:
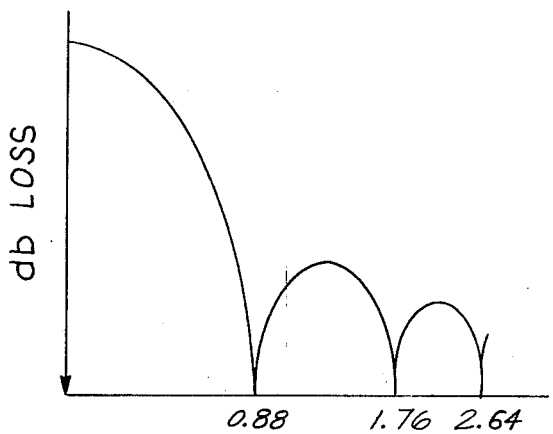
FIG. 1 is a graph of signal strength as a function of the ratio of gap length to recorded wavelength.
Figure 2:
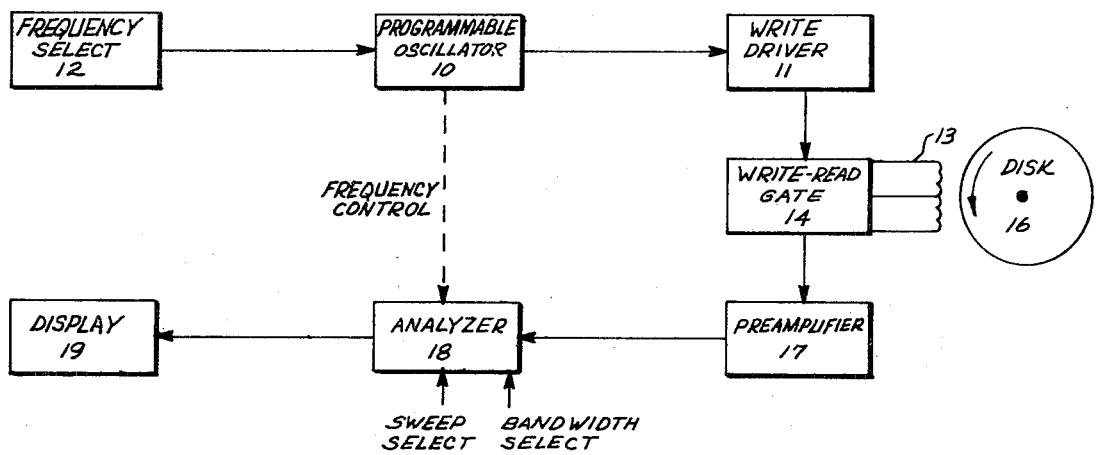
FIG. 2 is a block diagram of a measuring system constructed according to principles of this invention.

FIG. 2 illustrates in block diagram form apparatus for measuring magnetic gap length, according to principles of this invention. As illustrated in this preferred embodiment, there is provided a programmable oscillator 10 which provides an output signal to a conventional magnetic recording write driver 11 in accordance with a frequency select control 12. The programmable oscillator provides a high frequency output signal, the frequency of which is well known and controllable over a selected range. The frequency should be known to at least one part in two hundred for good accuracy. The frequency select 12 can, for example, merely be a control knob on such a conventional programmable oscillator 10.

It should be noted that the various components identified in the block diagrams are all conventional instruments available from a variety of commercial sources and this invention does not lie in the specific details of any of the selected components. Thus, for one example, the write driver 11 is merely a conventional gating and amplifying arrangement for coupling signals to a magnetic recording transducer and a broad variety of such write drivers are commercially available for the broad variety of magnetic transducers commonly employed in modern magnetic recording systems.

The writing signal from the write driver 11 is applied to a conventional magnetic transducer 13 by a write-read gate 14 which is, in effect, a switch that alternatively couples the transducer 13 to the writing circuit or to a circuit as hereinafter described for reading magnetic signals. The magnetic transducer 13 is the transducer whose magnetic gap it is desired to determine.

The write driver 11 through the write-read gate 14 applies a current to the coils of the transducer 13 which thereby induces a magnetization in a magnetic recording medium on a rotating disk 16. The write driver applies current alternately to the two coils of the transducer 13 so that the polarity of magnetization on the disk is alternately reversed and the frequency of reversal is determined by the signal frequency from the programmable oscillator 10. The recorded wavelength of signal on the disk 16 is determined by the oscillator frequency and the speed of rotation from the disk. In a typical embodiment, the disk is rotated in the order of 1,000 to 1,200 r.p.m. and a frequency in the range of about 1 to 6 megacycles per second is employed so that the alternating signal is recorded on the disk at the rate in excess of about $10^4$ bits per inch.

After such a train of signals of known wavelength is recorded on the disk, the magnetic transducer 13 is employed for reading the signals and the write-read gate 14 applies these signals by way of a preamplifier 17 to a frequency analyzer 18. The analyzer output is applied to a display device 19 which, in a typical embodiment, may be an oscilloscope wherein signal strength is displayed in a $y$ direction and frequency in an $x$ direction, or may merely be a panel meter.

The frequency analyzer 18 is a conventional wave analyzer or spectrum analyzer which can be thought of as a filter having a finite bandwidth window which is tunable through a selected frequency range. The strength of signals along the frequency spectrum is selectively measured over a very narrow band as they are "framed" by the window and an output voltage proportional to the signal strength is provided. A spectrum analyzer measures the relative amplitudes of frequencies within a selected bandwidth, in the same manner as a wave analyzer, and the center frequency and bandwidth are both individually tunable or selectable.

Thus, as illustrated in FIG. 2, a center frequency of the analyzer is selected by a frequency control connection to the programmable oscillator 10 so that the center frequency analyzed is substantially the same as the frequency recorded on the rotating disk 16. The bandwidth of the "frequency window" of the analyzer is selected sufficiently wide to provide a reasonable signal amplitude as the recorded signal is read and sufficiently narrow that most of the noise is excluded.

The noise involved in a magnetic recording system is principally randomly distributed over frequency so that within any narrow frequency band the total noise level is relatively small. Occasionally, noise intensity peaks are observed at selected frequencies, however this raises no substantial problems since these frequencies are normally very sharply defined as compared with the nulls being sought and the noise peaks are often associated with instrumentation or mechanical resonances that are eliminated by minor adjustments such as a slight change in the speed of rotation of the disk.

The analyzer 18 also includes a means for selecting a certain sweep range so that the range of frequency scanned by the analyzer can be adjusted, that is, the narrow bandwidth window on the frequency spectrum is swept across a wider band of frequencies so that the signal strength as a function of frequency is determined over a range including the center frequency originally recorded and a selected range on each side thereof. Sweeping the narrow band over a short range of frequency assures that the amplitude is measured at the frequency recorded and not slightly off of this frequency. The result on the display oscilloscope 19 is a trace of signal intensity as a function of frequency over the range of sweep selected. In a typical embodiment this appears as a curve of a Gaussian shape and the amplitude of interest is the peak amplitude at the center of the Gaussian curve, which corresponds to the recorded wavelength.

A convenient technique for measuring the signal amplitude is to select an arbitrary signal strength, normally that obtained for the lowest frequency recorded, and thereafter apply increasing amplification to weaker signals in order to bring them up to the same signal strength. The gain applied by such an amplifier is readily determined and good precision is obtained by bringing a displayed signal to a given peak height as compared to measuring a peak height of a displayed signal, particularly with the weak signals involved herein. An even better technique applies attenuation to a strong signal to bring it to a selected low value and then attenuate weaker signals by a lesser amount to reach the same low signal strength. The degree of attenuation is readily found with good accuracy and does not suffer from any variations in amplifier gain. In this manner a very high dynamic range of measurements can be obtained, often in the range of 60 to 80 db's of signal loss.

Most wave analyzers or spectrum analyzers employ a heterodyning principle with a tunable local oscillator and a selectable frequency bandwidth to obtain the frequency selectivity required for a given application. Additional heterodyning may be employed to improve sensitivity and selectivity through a chosen bandwidth. The analyzer then has a first voltage output proportional to the amplitude of the input signal from the preamplifier 17 which is applied to the vertical axis of the display 19, and a second voltage output proportional to the local oscillator frequency is applied to the horizontal input of the display. The result is a plot of amplitude versus swept frequency on the display.

The peak amplitude so measured is the signal amplitude read from the disk for a single frequency or recorded wavelength on the disk (actually for a very narrow frequency band). The absolute value of this amplitude is not employed for finding the length of the magnetic gap. Instead, this value at some frequency giving a recorded wavelength longer than the magnetic gap length is arbitrarily considered as a reference value.

Figure 4:
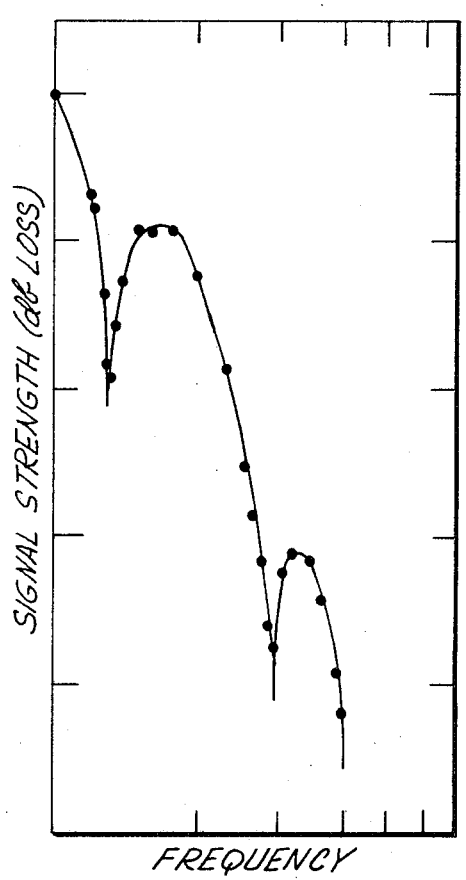
FIG. 4 is a typical measured graph of signal strength as a function of frequency for a magnetic transducer having a typical gap of uniform width.

The frequency selected for the programmable oscillator 10 is then increased so as to write a new train of signals on the disk 16 at a shorter recorded wavelength than the initial train of signals. This new train at a shorter recorded wavelength is read in the same manner and analyzed by the analyzer 18 with the same selected bandwidth, i.e., frequency window, as employed for the first frequency. The signal amplitude is again measured from the display oscilloscope 19 and typically this amplitude is less than that measured at the somewhat lower frequency. The decrease in signal amplitude is preferably stated in terms of loss in decibels and a series of such measurements are made over a range of increasing frequency or decreasing recorded wavelength with the results conventionally plotted in a graph such as illustrated in FIG. 4. In this graph, the signal loss in decibels is plotted vertically with the loss increasing downwardly, i.e., the signal amplitude increases upwardly. The horizontal coordinate is frequency increasing to the right, i.e., recorded wavelength is decreasing toward the right.

The result of a series of measurements at increasing frequency is a curve starting at some arbitrary point where the first frequency was selected and where the read signal is designated as having zero loss, and as the frequency increases, the loss increases (the curve goes downwardly in FIG. 4) until the recorded wavelength reaches a value where the ratio of magnetic gap length $g$ to recorded wavelength $\lambda$ is 0.88, which as pointed out hereinabove involves a null or minimum in signal amplitude. As the frequency is increased from this value, the signal strength rises from the null through a maximum and decreases toward a second null wherein the ratio is 1.76. Thus, with knowledge of the frequency and hence recorded wavelength, and the relative signal amplitude, the magnetic gap length is determinable. It is preferred to employ the first or second null since the signal strength is highest, however, other nulls can be used having a low integral spacing from the first null.

Figure 3:
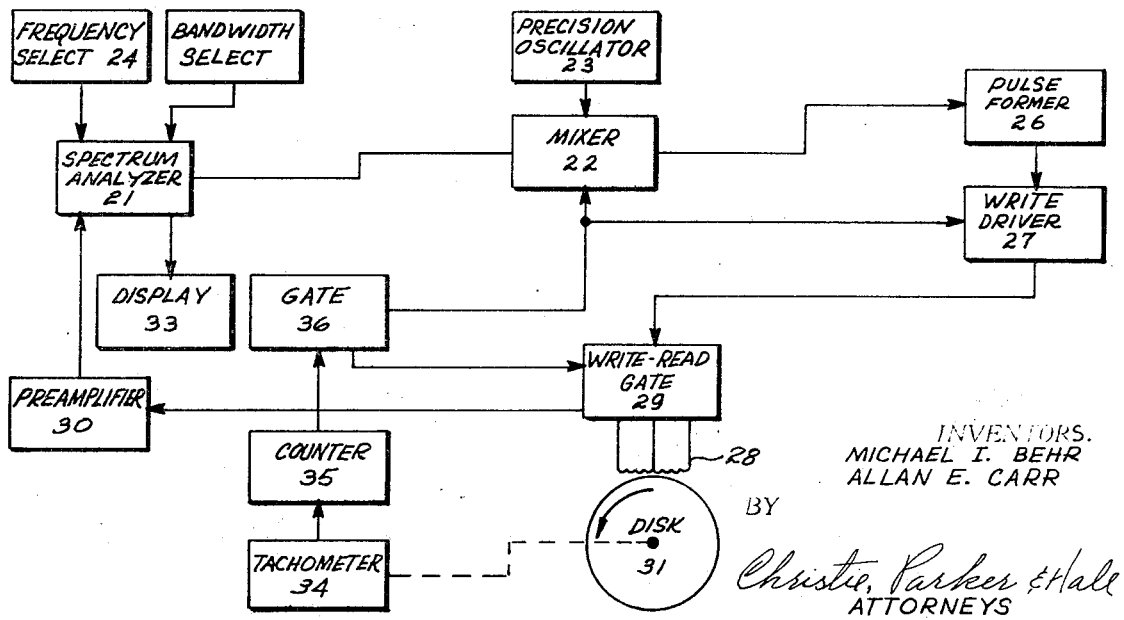
FIG. 3 is a block diagram of an exemplary combination of equipment for measuring magnetic gap length.

FIG. 3 illustrates in somewhat greater detail, in block diagram form, apparatus combined for measuring magnetic gap length of a magnetic transducer. As illustrated in this embodiment, a high frequency signal is extracted from a spectrum analyzer 21 and applied to a mixer 22. In a typical embodiment, the spectrum analyzer 21 has a controllable high frequency oscillation employed in heterodyning of 61 to 66 megacycles, for example. This frequency is too high for the gap length measurements and therefore it is mixed with a signal from a precision oscillator 23 which may, for example, oscillate at 60 megacycles. The result is a controllable output signal from the mixer 22 in the range of 1 to 6 megacycles. Selection of a frequency in this frequency range is conventionally controlled by a frequency select knob 24 on the spectrum analyzer.

The output signal from the mixer 22 is applied to a pulse former 26 which is typically a frequency doubler and shaper for producing a symmetrical wave output for application to a write driver 26 which is coupled to a test magnetic transducer 28 by a write-read gate 29, in the same manner as pointed out hereinabove. The magnetic transducer 28 is adjacent a recording disk 31 on which is a magnetic recording medium for recording signals from the transducer. The write-read gate 29 is also coupled to a preamplifier 30 for receiving signals read from the disk 31. The output of the preamplifier 30 is applied to the spectrum analyzer 21 and its output is in turn connected to a display oscilloscope 33 for displaying signal amplitude as a function of frequency.

It will be seen that the basic arrangement provided by this combination of elements is similar to that hereinabove described in relation to FIG. 2, with the variation that the spectrum analyzer which includes the capability of frequency tuning is employed for both analysis and as a programmable oscillator. The oscillation is mixed with the output of a fixed frequency precision oscillator 23 for obtaining a usable frequency for writing on the disk. In this manner, the spectrum analyzer serves two functions alternatively. In other respects, the system operates substantially the same as the system described hereinabove in relation to FIG. 2.

In order to control operation of the system, a tachometer 34 is connected to the disk 31 for providing an output signal on each revolution thereof. This output signal is applied to a counter and gate 35 which, for example, is a five stage counter counting up to 32. The counter is connected to the mixer 22, the write driver 27 and the write-read gate 29, so that on the first count the write driver is switched to a condition that erases or premagnetizes the recording medium on the disk. This occurs around an entire recording track on the disk since the counter 35 is at count 1 for one full revolution of the disk.

After one revolution the tachometer provides a signal and the counter advances to count 2 which activates the mixer 22 and the write driver 27 for writing on the recording disk. The write-read gate 29 is also in the write condition on the second count, however it is noticed that a conventional gate is insufficient to completely shield the analyzer from the large write signal and a large "output" signal appears on the display scope 33 and is merely ignored.

After a full revolution at count 2, the tachometer provides another signal and the counter advances to count 3, at which time the mixer 22 and write driver 27 are deactivated and the write-read gate 29 is switched to the reading condition so that signals on the recording medium as detected by the transducer 28 are applied to the spectrum analyzer 21 for analysis and display on the oscilloscope 33. The mixer 22 and write driver 27 are both deactivated during this time so that the continuing oscillation of the spectrum analyzer is not superimposed on the signal read by the transducer. As the disk continues to rotate, additional signals are provided by a tachometer 34 and the counter 35 continues to count up to count 32. The recorded signals are read by the transducer and applied to the display 33 during counts 3 through 32 and then the counter 35 recycles to count 1 at which time the cycles repeats.

In a typical embodiment the disk takes about 50 milliseconds to make one full revolution and therefore the 32 count cycle takes about 1½ seconds. During most of this period (30 counts thereof) the signal is being read from the disk and displayed and the maximum signal amplitude can be measured. During the brief writing time in each counting cycle a high signal pulse is observed on the oscilloscope and this is ignored. After the peak signal amplitude has been measured at one frequency, the center frequency is increased to record signals at a shorter recorded wavelength. It is preferred to periodically erase and rerecord the magnetic signals as in response to the counter to provide for a ready change of frequency and also to minimize the influence of minor fluctuations in the apparatus that may occur over a longer time interval. Thus, for example, during one counting cycle no substantial variation in speed of rotation of the disk or oscillating frequency of the spectrum analyzer is likely.

The technique provided in practice of this invention not only determines the length of a magnetic gap when the sides of the gap, i.e., the edges of the pole pieces, are parallel, but also enables measurement of the magnetic gap when the sides are tapered. During recording and reading the width of the magnetic transducer, which may be in the order of several hundredths of an inch, extends in a direction transverse to the direction of motion between the transducer and the magnetic recording medium. It is the width of the transducer that effectively determines the width of the recording track along the rotating disk. The "width" of the magnetic gap transverse to the direction of travel may therefore be many times the "length" of the magnetic gap in a direction along the direction of travel. If the magnetic gap length is different at opposite ends of the "width," the recorded wavelength at which the null in signal strength is observed is different at the two ends of the tapered gap and no sharp null is observed in the curve of signal amplitude versus frequency. It is found, however, that by recording at a known wavelength and measuring the signal amplitude over a very narrow bandwidth, noise is effectively excluded and signal amplitude can normally be measured with sufficient sensitivity to determine the gap length at both ends of the tapered gap.

Figure 5:
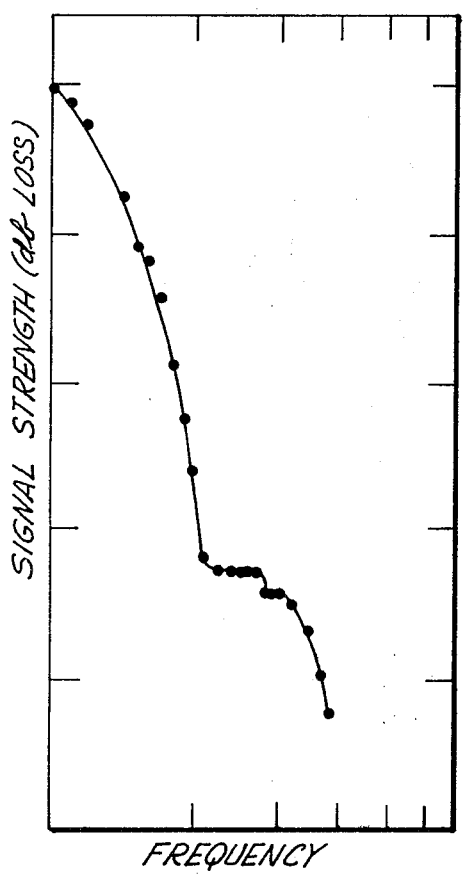
FIG. 5 is a graph similar to FIG. 4 for a transducer having a tapered gap.

Thus, as illustrated in the exemplary curve of FIG. 5, the signal strength versus frequency for a transducer with a tapered gap that varied from 15 to 20 microinches at the opposite ends thereof is a curve without deep nulls. Although a sharp null was not identified. A pair of very clear inflections 38 and 39 were observed corresponding to the gap lengths at the two ends of the transducer. No substantial variation in signal amplitude was observed between the two inflections. Such inflections in signal amplitude are not observable in the course of a mere sweep of frequency of recording and reading of signal output since they are obscured by noise. The described technique is therefore not only suitable for measuring magnetic gap lengths in transducers with parallel gaps but also identifying transducers with tapered gaps and measuring the gap length at the two ends of the tapered gap.

Figure 6:
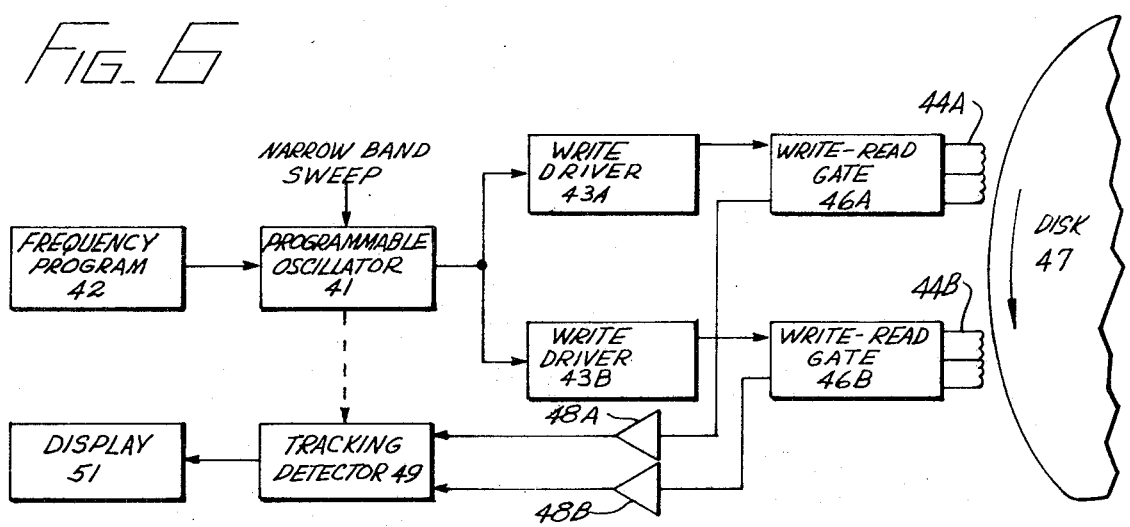
FIG. 6 illustrates in block diagram form an equipment arrangement for comparative measurements of magnetic gap length.

In many situations it is not necessary to determine the actual gap length since, for example, for quality control purposes, it may only be necessary to determine the deviation of gap length from some selected standard. In such a situation an apparatus as illustrated in FIG. 6 is employed. As illustrated in this embodiment, a programmable oscillator 41 having a controllable narrow band sweep provides a signal of controlled frequency as determined by a frequency program 42. The frequency program is preferably in preselected steps commencing at a frequency below the first null in the signal strength versus wavelength curve. The program can proceed through the selected frequency steps as stimulated manually or automatically, such as, for example, by a computer.

The output signal from the programmable oscillator which has a known frequency is applied to a pair of write drivers 43A and 43B. The write driver 43A provides an output signal in the conventional manner to a magnetic recording head 44A by way of a write-read gate 46A. The transducer 44A is one in which the magnetic gap length is unknown and which is being measured in the apparatus. The output signal from the write driver 43B is applied to a standard transducer 44B by way of a write-read gate 46B. The standard transducer 44B is a transducer having a selected gap length that is well known and selected as a standard.

The test transducer 44A and the standard transducer 44B both record signals on a rotating disk 47. The two transducers are preferably mounted on opposite sides of the disk 47 so that they can both write on tracks at the same radius so that there is no difference in the wavelength recorded by the two heads. Even if the two transducers are on the same side of the disk the radial distance from the center is normally quite large compared with the spacing between the tracks on which the transducers record and the difference in wavelength is small and the error introduced is not significant. If a magnetic drum or tape is employed instead of a disk 47 the wavelength from both transducers is the same.

During the reading cycle the magnetic transducers 44A and 44B detect magnetic signals recorded on the disk 47. The signal from the test transducer 44A is applied through the write-read gate 46A to a preamplifier 48A, the output of which is applied as one input of a conventional tracking detector 49 which may, for example, be a tunable logarithmic amplifier. Similarly, the output signal from the standard transducer 44B is applied to a preamplifier 48B, the output of which is applied as another input to the tracking detector 49. The tracking detector 49 measures the difference in signal amplitude between the two signal inputs at a frequency controlled by the programmable oscillator 41 and the signal difference between the two transducers is applied to a display device 51 for measuring the difference in signal amplitudes. When there is only one input to the tracking detector its response is the same as a wave analyzer.

Since the difference in signal amplitudes is measured rather than the absolute amplitude the dynamic range of the measuring instrumentation can be less and excellent sensitivity is obtained with an arrangement as provided in FIG. 6. It should also be apparent that in lieu of employing an oscilloscope or the like for displaying and measuring the signal amplitude or amplitude difference the signals can be recorded for later measurement which enables more rapid frequency or wavelength scanning, or the signals can be processed in near real time by a computer in order to provide a substantially continuous measure of signal loss as a function of frequency and thereby provide very rapid determinations of magnetic gap length with automatic plotting of the signal strength versus frequency curve.

Although but two embodiments of the present invention have been described and illustrated herein, it will be apparent that many variations and modifications can be made by one skilled in the art. Thus, for example, instead of varying the recorded wavelength by varying the frequency of oscillation of a controllable oscillator, a fixed frequency precision oscillator can be employed and the rotational speed of the disk varied incrementally in order to vary the recorded wavelength. Many other similar variations will be apparent to one skilled in the art and it will be understood that within the scope of the appended claims the invention may be practiced otherwise as specifically described.

What is claimed is:

1. In a method for measuring magnetic gap length of a magnetic transducer comprising the steps of:

writing with the transducer a magnetic signal of known frequency on a moving magnetic recording medium, the recorded wavelength of the signal being in the same order of magnitude as the gap length of the transducer or a small multiple thereof;

reading the recorded magnetic signals with the transducer;

sweeping a narrow frequency bandwidth over a short range of frequency spanning the recorded frequency and measuring the maximum read signal amplitude within the short range of frequency;

repeating the writing, reading and measuring steps over a selected range of frequencies having recorded wavelengths spanning the gap length of the transducer or a small multiple thereof; and plotting the signal amplitude as a function of wavelength for identifying the location of a null in signal amplitude corresponding to known recorded wavelength; the improvement comprising the steps of:

periodically erasing the written magnetic signal; and rewriting a new magnetic signal, the period of the erasing and rewriting steps being sufficiently short that no substantial variation in speed of movement of the recording medium occurs.

2. Apparatus for measuring magnetic gap length of a magnetic transducer comprising:

a controllable oscillator;

means for controlling the frequency of oscillation of the oscillator;

a write driver for the magnetic transducer coupled to the oscillator, and adapted to be coupled to the transducer for writing a magnetic signal of known frequency on a moving magnetic recording medium, the recorded wavelength of the signal being in the same order of magnitude as the magnetic gap length of the transducer or a small multiple thereof;

a wave analyzer adapted to be coupled to the transducer for reading the recorded magnetic signals in a narrow frequency bandwidth including the recorded frequency;

means for displaying read signal amplitude as a function of frequency;

means for adjusting the means for writing for repeated writing at a plurality of frequencies having recorded wavelengths spanning the gap length of the transducer or a small multiple thereof; and gate means for selectively coupling the transducer to the write driver or to the wave analyzer.

3. Apparatus for measuring magnetic gap length of a magnetic transducer comprising:

a controllable oscillator;

means for selecting an oscillating frequency of the oscillator;

means for selectively coupling a magnetic transducer to the oscillator for writing magnetic signals on a moving magnetic recording medium at a frequency determined by the oscillator, the frequency being such that the recorded wavelength of the magnetic signals is in the same order of magnitude as the magnetic gap length of the transducer or a small multiple thereof;

an analyzer; and means for selectively coupling the magnetic transducer to the analyzer for reading the recorded magnetic signals in response to movement of the moving recording medium.

5. Apparatus as defined in claim 3 further comprising:
display means for indicating signal amplitude coupled to the output of the analyzer.

5. Apparatus as defined in claim 3 wherein the movable magnetic recording medium comprises a rotatable disk; and further comprising:
means for sensing rotation of the disk;
for controlling the means for coupling for reading in response to the sensed rotation.

6. Apparatus as defined in claim 3 wherein the analyzer comprises a spectrum analyzer and the oscillator is a component of the analyzer;
the means for coupling for writing comprises a pulse former connected to the oscillator, a write driver connected to the pulse former, and a gate coupling the write driver to the magnetic transducer; and
the means for coupling for reading comprises the gate coupled to the transducer and an amplifier between the gate and the spectrum analyzer.

7. Apparatus as defined in claim 6 wherein the movable magnetic memory medium comprises a rotatable member and the means for coupling comprises:
means for sensing rotation of the member;
a counter connected to the means for sensing; and
a gate for selectively coupling the spectrum analyzer to the means for writing and to the means for reading in response to the counter.

8. Apparatus as defined in claim 3 further comprising:
means for selectively coupling a second magnetic transducer having a known magnetic gap length to the oscillator;
means for selectively coupling the second magnetic transducer to the analyzer; and wherein
the analyzer comprises means for measuring the difference in signal amplitude between the first and second magnetic transducers.

9. Apparatus as defined in claim 8 further comprising:
means for sensing movement of a recording medium and coupled to the gate means for actuating the gate means in response to movement.

10. Apparatus as defined in claim 9 wherein the gate means cooperates with the write driver and wave analyzer for periodically interrupting reading of the written magnetic signal, erasing the written magnetic signal, recording a new magnetic signal on the recording medium, and returning to reading the new written magnetic signal.

* * * * *